4 - 711 3?
2/3/87 XR RE 32,365

United States Patent [19]

Sebestyen

[11] E Patent Number: Re. 32,365

[45] Reissued Date of Patent: Mar. 3, 1987

[54] PRECESSING DISPLAY PAGER

[75] Inventor: George Sebestyen, Weston, Mass.

[73] Assignee: Sanders Associates, Inc., Nashua, N.H.

[21] Appl. No.: 568,549

[22] Filed: Jan. 5, 1984

Related U.S. Patent Documents

Reissue of:

[64] Patent No.: 3,976,995
Issued: Aug. 24, 1976
Appl. No.: 580,075
Filed: May 22, 1975

[51] Int. Cl.[4] ..... G09G 3/00; H04B 1/00

[52] U.S. Cl. ..... 340/311.1; 340/792; 340/711; 340/365 R

[58] Field of Search ..... 340/311.1, 792, 791, 340/365 R; 178/4.1

[56] References Cited

U.S. PATENT DOCUMENTS

| | | | |
|---|---|---|---|
| 940,444 | 11/1909 | Einbigler . | |
| 1,953,072 | 4/1934 | Casper . | |
| 1,967,887 | 7/1934 | Johnston . | |
| 1,973,539 | 9/1934 | Morton et al. . | |
| 2,097,392 | 10/1937 | Finch . | |
| 2,314,920 | 3/1943 | Bumstead . | |
| 2,353,083 | 7/1944 | Roth . | |
| 2,941,161 | 6/1960 | Scantlin . | |
| 2,943,148 | 6/1960 | Hell . | |
| 2,977,415 | 4/1960 | Van Breeman . | |
| 3,271,680 | 9/1966 | Reynolds . | |
| 3,355,709 | 11/1967 | Hanus . | |
| 3,384,888 | 5/1968 | Harnden, Jr. et al. . | |
| 3,396,377 | 8/1968 | Strout . | |
| 3,432,846 | 3/1969 | Jones et al. | 340/792 |
| 3,447,133 | 5/1969 | Cole et al. . | |
| 3,465,294 | 9/1969 | Carsello et al. . | |
| 3,476,877 | 11/1969 | Perkins et al. . | |
| 3,493,957 | 2/1970 | Brooks . | |
| 3,512,158 | 5/1970 | Scarbrough . | |
| 3,550,001 | 12/1970 | Hanley . | |
| 3,562,438 | 2/1971 | Radomski et al. . | |
| 3,566,388 | 2/1971 | Andrews et al. . | |
| 3,597,690 | 8/1971 | Wycoff . | |

(List continued on next page.)

FOREIGN PATENT DOCUMENTS 786041 11/1957 United Kingdom

OTHER PUBLICATIONS

*Electroluminescent Typewriter;* Hamburger N.E.C., vol. 15, pp. 575–584; 1959.

"Personal Signaling, A New Telephone Service"-Newton Monk, et al, In 1958 Ire Weston Convention Record, part 8, pp. 76–79, 82–83.

Comparison of Mobile Radio Transmission at 150, 450, 900 & 3700 Mc, W. Rae Young, Jr., In *The Bell Systems Technical Journal*, vol. 32, Nov. 1952, pp. 1068–1085.

"Radio Transmission into Buildings at 35 and 150 mc" by L. P. Rice, In *The Bell Systems Technical Journal*, vol. 38, Jan. 1959, pp. 197–210.

"A Complete Interactive Terminal You Can Hold in One Hand", *Modern Data;* Apr. 1974; pp. 34–36.

*Primary Examiner*—Marshall M. Curtis
*Attorney, Agent, or Firm*—Louis Etlinger; Stanton D. Weinstein

[57] ABSTRACT

A hand held paper pager is disclosed in which a transmitted message is displayed in alpha/numeric form by a precessing display which moves the received message across the display in a continuous fashion so that the display need be only large enough to present a relatively small portion of the total message at any given time. In one embodiment a dot matrix LED display is used and is driven by a recirculating shift register memory to provide the precession of the message as a result of the recirculation. In another embodiment the pager may also include a message entry section in which the precessing display is used to present and edit the message prior to transmission either via an acoustic telephone link to a remote transmitter, or directly from a transmitter carried in the pager/encoder package.

26 Claims, 3 Drawing Figures

U.S. PATENT DOCUMENTS

| | | | |
|---|---|---|---|
| 3,613,004 | 10/1971 | Wycoff . | |
| 3,628,150 | 12/1971 | Ditthardt . | |
| 3,639,906 | 2/1972 | Tritsch . | |
| 3,651,413 | 3/1972 | Wycoff . | |
| 3,651,463 | 3/1972 | Rawson et al. . | |
| 3,654,604 | 4/1972 | Crafton . | |
| 3,657,655 | 4/1972 | Fukata . | |
| 3,686,635 | 8/1972 | Millington et al. . | |
| 3,729,680 | 4/1973 | McDonald . | |
| 3,737,857 | 6/1973 | Carman . | |
| 3,753,038 | 8/1973 | Liddle | 340/768 |
| 3,772,597 | 11/1973 | Stover | 340/365 S |
| 3,774,114 | 11/1973 | Dahlgren . | |
| 3,783,384 | 1/1974 | Wycoff . | |
| 3,846,783 | 11/1974 | Aspell et al. . | |
| 3,911,424 | 10/1975 | Giannuzzi et al. | 340/756 |
| 3,914,741 | 10/1975 | Bonser et al. . | |
| 3,944,724 | 3/1976 | Kilby et al. | 178/4.1 A |
| 4,007,443 | 2/1977 | Bromberg et al. | 340/709 |

PRECESSING DISPLAY PAGER

Matter enclosed in heavy brackets [ ] appears in the original patent but forms no part of this reissue specification; matter printed in italics indicates the additions made by reissue.

FIELD OF THE INVENTION

This invention relates to paging systems and, more particularly, to a hand held pager which silently stores the message transmitted to the recipient in such a manner that the message can be read out at the convenience of the recipient by a precessing display.

BACKGROUND OF THE INVENTION

It is common practice to provide pagers which emit an audible tone indicating that a particular recipient is to receive a message. Thereafter, the message is transmitted via voice communication to the recipient whether or not this recipient is ready to receive the message. As a result, the content of the message is sometimes lost when the recipient either cannot remember the content of the message or a pencil and paper is not immediately available to transcribe the message. This is particularly severe when telephone numbers or addresses are transmitted. The result is frustration of the recipient and the necessity of communicating with the originator of the message to obtain its content. In one broad aspect, this invention alleviates the inconvenience of the prior art paging systems by providing storage and recall of the transmitted message through the use of a precessing display of a stored message (soft copy unit) in an unattended unit.

In another broad aspect of this invention, a portable encoder unit is coupled via a telephone link to a common carrier paging transmitter. The system is compatible with existing transmitters and permits the encoding of messages anywhere that telephone service is available. It is a feature of the subject invention that the encoded message may be transmitted through the common carrier transmitter audio channel as a substrate for voice communication without alteration of existing unattended transmitting equipment. In this regard, in one embodiment, the encoder includes a message entry keyboard and means for converting the entered message into a series of audio tones for transmission on the audio channel after the transmitter has automatically sent a predetermined address code[,] responsive to the dialed telephone number. Thus, no additional message encoding apparatus or tone generating equipment is necessary at the common carrier transmitter. In one embodiment, the encoding unit may include a precessing display for message editing and review prior to transmission[,] or, alternatively, other types of editing displays may be used.

As illustrated in U.S. Pat. No. 3,846,783 issued to Aspell et al. on Nov. 5, 1974, it is known to provide a pager with a hard copy printout. While the Aspell patent describes generally the use of light emitting diodes or liquid crystals for displaying a message, the subject invention provides, in one embodiment, for a precessing display which rolls by characters across a limited field. This type display permits the display of messages which have a greater length than the display by precessing the message across the display.

In one embodiment, the pager utilizes a ROM-driven LED dot matrix display fed by a recirculating shift register memory which generates the precession as it recirculates. In another aspect of the subject invention, the LED display enables the presentation of the message in the dark a portion at a time. In the subject soft copy pager, the message is stored in the pager's memory and may be recalled at the convenience of the recipient by a precessing alpha/numeric display so that the information contained in the message can be made available at the convenience of the recipient. In a further embodiment, the soft copy pager is provided with encoding means so that a message can be composed on the soft copy unit prior to its transmittal to a high power transmitter for transmission to another paging unit.

It is therefore an object of this invention to provide an improved hand held paging system in which a message transmitted to a recipient is stored at the pager for readout at the convenience of the recipient.

It is another object of this invention to provide a pager which is inexpensive, silent and displays a message in alpha/numeric form a portion at a time.

It is a further object of this invention to provide a method of transmitting a message in which the message is stored at a remote location in a memory and in which the message is recalled by the recipient at his convenience through the use of a precessing display.

It is another object of this invention to provide a precessing display pager in which the precession is generated by a recirculating shift register.

It is [a] still *a* further object of this invention to provide a soft copy pager which may be utilized both for the receipt of a transmitted message and for the encoding of a message to be transmitted thereby combining in one unit the two functions.

It is [a] yet still *a* further object of this invention to provide a paging system in which messages may be locally encoded and transmitted on the audio channel of existing unattended common carrier transmitting equipment.

These and other objects of this invention will be better understood in connection with the following [desription] *description* in view of the appended drawings in which.

DETAILED DESCRIPTION

Figure 1:
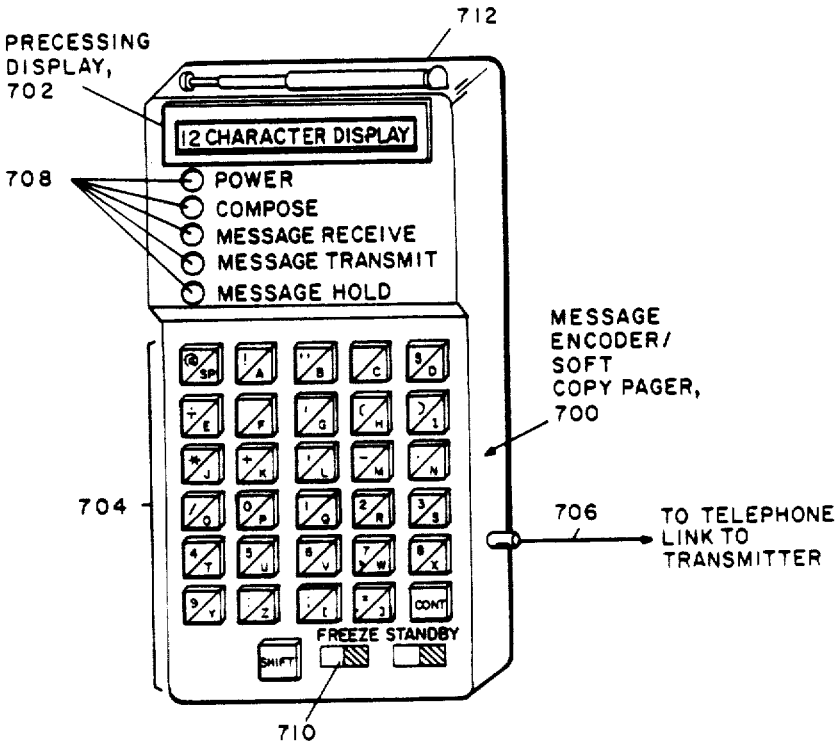
FIG. 1 is a diagrammatic representation of a soft copy pager/message encoder combination which utilizes a precessing display.

Referring to FIG. 1, a pager 700 is illustrated in which a received message is reproduced in alpha/numeric form by a precessing display 702. This pager also can be used for message encoding and has a keyboard 704 for this purpose. The pager has an internal memory into which a message may be written, either by receipt of a transmitted signal or by local keyboard message entry. In the encoding mode, the message is [enetered] *entered* into the internal memory and then transmitted by an acoustic link 706 to a transmitting station. In one embodiment, the encoded message is displayed on a [12] *twelve* character precessing LED display which is utilized for message composition and for editing prior to message transmission. A sufficient number of keys are provided on the face of the message encoder/soft copy pager to permit correction and to initiate readout of the encoded message from the internal memory of the pager. The encoded message is made available at link 706 which is acoustically coupled through telephone lines to a remote high power transmitting station. Alternatively, the message encoder/soft copy pager may be provided *with* a transmitter such that the address and message may be transmitted from this unit for a short distance to other pagers within the area. For this purpose, a collapsible antenna 712 is provided, as illustrated.

In either the receiver or encode mode, the message in the memory is precessed across the display. By precessing is meant that the message is made to travel across the display such that the portion of the message that has already been viewed disappears, while at the other end of the display new portions of the message are generated. As will be appreciated, receipt of a message may be indicated by any convenient message indicator. Various indicator lights, generally indicated by reference characters 708, are available on the face of the unit to indicate the various modes of operation of the device such as an indication of Power-On and receipt of a message, that a compose cycle is selected, that a message is being transmitted, or that a message is being held. The recipient displays the message by pressing an appropriate key on the keyboard. Should the recipient wish to stop the message from precessing, a "freeze" switch 710 is provided. In this embodiment, the receipt of a new message automatically clears the old message from the memory included in the soft copy pager unit. In [anaother] *another* embodiment, the messages can be made to "stack" into memory in the order in which they arrive.

In operation, a message for the soft copy pager is transmitted with, for instance, a predetermined digital address. After decoding of the address, the FSK message code is decoded within the pager and stored in an internal memory. This memory is read out in a precessing fashion to a character decoding read only memory (ROM) which is [utilied] *utilized* in driving an electronic alpha/numeric display.

It will be appreciated that this pager serves the function of preserving the message for recall at the convenience of the recipient while, at the same time, providing that the message may be stored silently and recalled silently thereby not disturbing individuals in the vicinity of the pager.

Thus, in one unit, a message encoder and message receiving apparatus is combined. The significance of the combination is that the same precessing internal memory and the same read only memory may be utilized for message encoding and message decoding. Thus, in one embodiment, pager 700 functions as a soft copy pager, a message encoder, and a message transmitter. A block diagram of one embodiment of the soft copy pager of FIG. 1 having these three capabilities is illustrated in connection with FIG. 2 and is now described.

Figure 2:
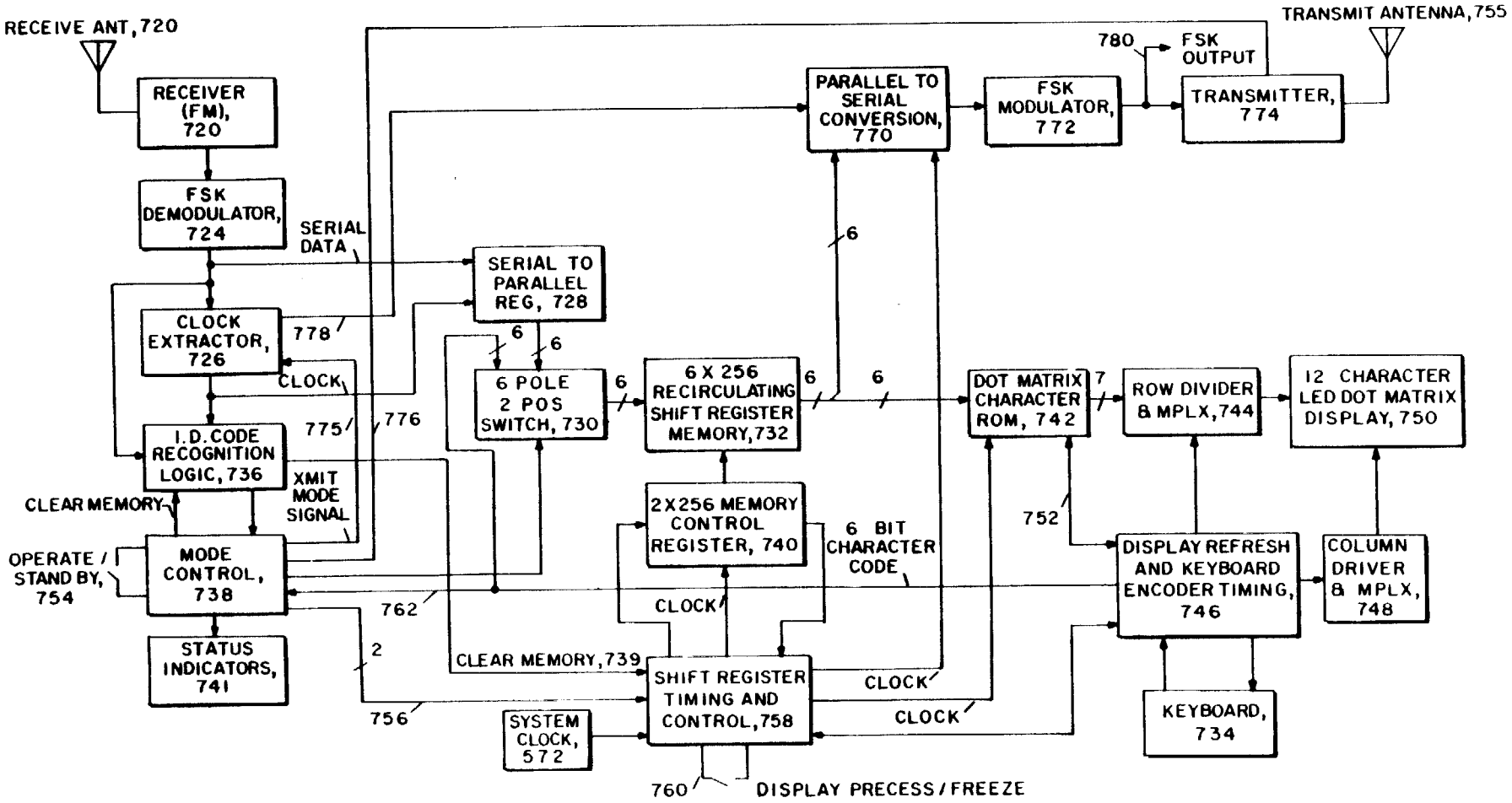
FIG. 2 is a block diagram of one embodiment of the pager/encoder of FIG. 1.

Referring to FIG. 2, a block diagram of one embodiment of the soft copy digital message communicator is illustrated as including a receiver 720 connected to an antenna 722. The output of the receiver is connected to an FSK demodulator 724. The output of the FSK demodulator includes serial data which is coupled both to a clock extractor 726 and to a serial-to-parallel register 728. The output of the serial-to-parallel register is the ASC II code of the incoming data. This is applied to a six pole, two-position switch 730 which, in the receiver mode, couples the data to the recirculating shift register memory. In the second position, switch 730 couples keyboard generated ASCII characters into the memory. In this figure, the recirculating shift register memory is indicated by reference character 732 and the keyboard by reference character 734.

The output of the FSK demodulator 724 is also coupled to an address or I.D. code recognition circuit 736 which, upon decoding of the proper ASCII character sequence, couples a signal to a mode control circuit 738 which forces the system into the receive mode by control of switch 730 and control of a clock extractor 726 which inter alia provides timing for the data transmission in the transmit mode. A signal is also transmitted over line 739 from the ID code recognition circuit to clear memory 732 in response to a signal indicating a mode change from mode control circuit 738. The status of the system is indicated by status indicators 741 which are driven by the mode control circuit.

In the receive mode, data from the serial-to-parallel register 728 is transmitted to recirculating shift register memory 732 which is under control of memory control shift register 740. The purpose of the memory control register is to ascertain the length of the message stored in memory 732 and the beginning thereof. This permits the readout of the message from memory 732 to the dot matrix character ROM 742 following the complete reception of the message. The dot matrix character ROM is read out to a row driver and multiplexer 744 and to a data refresh and keyboard decoder timing circuit 746. The display refresh and keyboard decoder timing unit 746 provides the appropriate timing signals for the column driver herein indicated by the reference character 748 such that the columns are actuated in the proper sequence to display memory contents. The display in one embodiment is a [12] *twelve* character LED dot matrix display 750 such as MONSANTO MKA3. The line between ROM 742 and display refresh and keyboard encoder 746 illustrated by line 752 is a two-way line which controls the timing of the character readout from the dot matrix in terms of the row driver and synchronizes this with the column driver activation and the multiplexing thereof.

It is an important feature of this portion of the soft copy unit that the message be stored in the memory for readout at the convenience of the recipient and also that the message be formed in such a way that it can be precessed across the dot matrix display. Readout of the message is accomplished by actuation of switch 754 which activates mode control 738 to establish a signal on line 756 thereby to control shift register timing and control unit 758 to activate the memory control register 740 which, in turn, activates memory 732 to serially dump its contents through to the dot matrix character ROM 742 in a recirculating manner thereby to cause the displayed characters to precess. Auxiliary switch 760 is provided to freeze the precession by controlling the memory control register.

It will be appreciated that memory 732, in essence, acts as a refresh buffer to restore the readout characters so that they can be read out again during recirculation. Thus, memory 732 in one sense is not a destructive memory and will destruct the data therein only upon command stimulated by the receipt of a new message, or by clearing due to keyboard encoding.

What has been described so far is the decoding of a received message by the subject soft copy unit. As mentioned hereinbefore[,] in connection with FIG. 1, it is possible to use this same unit for encoding the message and displaying the encoded message prior to transmission. In this sense, the display is utilized in the formulation of the message and can be utilized in a manner so that errors in the message may be corrected prior to transmission. To accomplish this, the message is encoded by actuation of keyboard 734 which, in turn, actuates display refresh and keyboard encoder timing 746 to generate a [6] *six* bit character code over line 762 which is coupled to switch 730 to enter the characters into the recirculating memory. This line also initially carries a signal which activates the mode control 738 to generate a signal coupled to switch 730 to switch from its receive mode to a message composition mode. Thereafter, the message is entered into the recirculating register from the keyboard and is simultaneously read out via the dot matrix character ROM to the display as described hereinbefore.

It will be appreciated that the output of the memory 732 is coupled to a parallel-to-serial converter 770 which converts the ASC II coded characters into a serial transmission for actuating FSK modulator 772 to modulate transmitter 774 to transmit the data. In the receive or encode mode, although data is continuous[1]y coupled from memory 732 to parallel-to-serial conversion unit 770, there are no clock pulses delivered to this unit so that no data is transmitted. When, however, the message to be transmitted has been successfully encoded, a character of a special type is transmitted on line 762 to the mode control unit 738, which forces the mode to the transmit mode. This develops a signal on lines 775 and 776 to actuate the transmitter and to actuate clock extractor 726 to produce clocking pulses on line 778 thereby to clock the parallel data into the parallel conversion unit 770 from whence it is coupled to the FSK modulator. It will be appreciated that the transmitter utilized may be internal to the soft copy unit or may be remote therefrom for the transmission of both the address and the message to another remote paging unit which may be either an identical soft copy unit such as described, or a hard copy unit in which digital addressing is utilized. The FSK output as illustrated by line 780 may be coupled to a suitable modem which transmits the address and message over standard telephone circuits to a remote transmitter such that the subject soft copy message communicator may be utilized solely as the encoder. Thus, encoders at different locations may be connected via a telephone link to the same transmitter with appropriate circuitry at the transmitting station to prevent overlap or to allow sequential access.

The precession of the display is accomplished, in one embodiment, as follows. The first character which is entered into the recirculating shift register memory from switch 730 causes a single one bit wide pulse to be clocked into the memory control register 740. This bit will subsequently be referred to as the "pointer" bit. The purpose of the pointer bit is to indicate the beginning of the message within the total length of the shift register memory. Its secondary function is to indicate the beginning of the display refresh cycle within the shift register memory when it is used for that purpose.

A second function of memory control register 740 is to provide a timing pulse to indicate the duration of the message stored in the memory. This is accomplished by clocking into memory control register 740 a logic level "1" bit each time a new character is clocked into the recirculating shift register memory 732. In this way, a logic level "1" pulse is formed in the memory control register which is coincident or synchronous with the message character contents of the recirculating shift register memory.

It will be appreciated that a [6] *six* bit ASCII coded message is serially clocked into the recirculating shift register memory. The beginning of this message is indicated by the aforementioned pointer bit and its duration [in] *is* indicated by the number of logic level "1" bits entered into the memory control register. This permits the recirculation of the message in the shift register memory via a feedback circuit within the shift registers. For this purpose, shift registers [menufactured] *manufactured* by National Semiconductor Co., model MM5056 may be utilized.

The clocking of the message so as to permit recirculation is accomplished via the output terminals of the shift registers within the memory control register. Depending on which portion of the cycle is then present, a certain number of clocking pulses are provided to the recirculating shift memory to [accomplsih] *accomplish* the recirculation. The clocking for recirculation is many times that for readout so that reloading of the memory during recirculation is done at a fast rate between two readout clock pulses. The pointer pulse and the length of message pulses are decoded such that fast timing pulses to the memory are only delivered for a length of time sufficient to recirculate the message. In order to stop the message at the appropriate point of its beginning, the pointer bits are recognized and the quick recirculation is terminated.

In the receive mode, the precession takes place automatically because the pointer bit is automatically shifted via the timing control circuit to the memory control register. [this] *This* is accomplished by a timer comprising a monostable multivibrator within shift register and timing control circuit 758 which, when it times out, produces a clock pulse which shifts the pointer bit in the memory control register by [1] *one* bit. In so doing, one character from the portion of the memory displayed is dropped and one character from the portion of the memory not displayed is added. The time constant of this monostable multivibrator is made compatible with the precession rate desired. It will be appreciated *that* by altering the timing components of the multivibrator, [that] the procession rate can be easily varied. Moreover, the precession rate is not controlled by any fixed counter or counting-type logic but rather is simply dependent upon the time out period of the multivibrator. The automatic time out feature is disabled during the encode mode by the mode control circuit.

The output signals from the recirculating shift register memory are applied as inputs to the dot matrix character ROM 742. The dot matrix character ROM drives the row driver multiplexing circuit 744 and, via the display refresh and keyboard encoder timing circuit 746, drives the column driver and multiplex circuit 748 such that characters are read out of the dot matrix ROM in five columns per character. Because of the recirculation of the shift register memory, the dot matrix character ROM is refreshed with the message such that, in one embodiment, the [12] *twelve* most recent characters are decoded by the ROM and are displayed. A Fairchild Memory Model No. 3257 is utilized as the dot matrix character ROM. It will be appreciated that row driver 744 includes switchable current sources for applying a voltage to the appropriate rows of the LED dot matrix display 750. The columns of these displays are actuated by the display refresh and keyboard encoder timing 746 which sequentially actuates the columns to produce the characters. This completes the description of the generation of a precessing display when the paging unit is in the receive mode.

In the encode mode, one of the functions of the pointer bit is to blank the display so that as each character is entered via the keyboard, it replaces a blank portion of the display with the appropriate character. In normal operation, [te] *the* recirculating shift register memory refreshes continually. With the advent of the pointer bit, the recirculating shift register cyclically reads out blank characters or spaces. Upon the depression of a character key, this character is added after the pointer bit and the blank characters are shifted one position to the right in the shift register such that one of the blank characters is lost and one character is added. This is reflected in the next character refresh cycle and the key depressed is now present for visual verification. The character refresh is going on all the time and at a very rapid rate such that the columns of the matrix display are rapidly and sequentially actuated via the clocking of the display, which also reads out the dot matrix character ROM. It will be obvious that the refresh cycle must be sufficiently rapid to avoid flickering of the display. It is therefore important when entering a character into the recirculating shift register memory that this be done at the appropriate time. In this case, the appropriate time means at the end of a refresh cycle. It is therefore the function of the pointer bit to insure that the character is entered into the recirculating shift register memory at this particular point and time. When a character key is depressed, the pointer bit is delayed by one bit position within the memory control register. This permits the next character to be entered at the correct time in the refresh cycle. When the display is full ([12] *twelve* characters displayed) the delay of the pointer bit by [1] *one* bit results in the display now presenting the characters following this pointer bit such that one character is deleted and one character is added.

By the shifting of the pointer bit, what is displayed therefore are [11] *eleven* old characters and one new character with the new character being the last one entered. This corresponds to a manual precession of the display such that the precession is controlled by the position of the pointer bit within the memory control register. What has been accomplished, therefore, is that by the depression of keys in the keyboard, a message is loaded into the recirculating shift register memory in timed relationship to the refresh cycle which is established by a pointer bit originated by depression of a control key and the appropriate character key in the keyboard. Since the recirculating shift register memory is continually read out to the dot matrix character ROM, what is read out of the shift register memory is displayed. Thus, changes in data held by the memory are immediately displayed.

Editing of the encoded message is accomplished very simply by precessing the display to the point where the inaccurate or error character is at the right hand most portion of the display. This corresponds to the pointer bit location and merely entering the appropriate correction at that time replaces the character in error with the corrected character. [the] *The* corrected character then appears at that display position corresponding to the key depressed.

Thus, a convenience feature of this particular pager is that there is provided on the keyboard a key which, when activated simultaneously with the control key, causes the precessing circuit to time out such that the display [precessed] *precesses* by one character at a time in a forward direction, corresponding to one depression of the key. This enables editing of the message by [exactly] *the exact* positioning of the message within the display such that locating [of] the error character at the right most display [positon] *position* is easily accomplished.

Another attractive feature of the subject pager is that by *activating* a simple freeze switch *to its ON position*, the automatic precessing circuit is disabled thereby freezing the message on the display in [the] *its* position at the moment that the freeze switch is actuated. Precessing continues when the precessing circuit is again enabled by [throwing] *changing* the freeze switch to its OFF position. It will be appreciated that the freeze switch is in the freeze position during message composition.

It will also be [appreicated] *appreciated* that by tapping off [of] the lines between the recirculating shift register memory and the dot matrix character ROM to parallel-to-serial conversion shift register 770, the encoded message may be made available at the output of this shift register for transmission.

In order to transmit the encoded message, a control key is depressed on the keyboard along with a preselected character key such that the recirculating shift register memory is read out in a timed sequence compatible with the transmission of FSK modulation to a transmitter. It will be appreciated that parallel-to-serial conversion register 770 is loaded in synchronism with the clocking of the recirculating shift register memory during the specially timed readout. By virtue of the specially generated clocking signals, the recirculating shift register is read out in parallel a word at a time to the parallel-to-serial conversion register. Thereafter, the parallel-to-serial conversion register is clocked serially to read out this word.

With the output of the parallel-to-serial conversion register 770 being applied to a conventional FSK modulator, it will be appreciated in one embodiment that the signal from the FSK modulator may contain an address code followed by a message. The addresses will, of course, be entered from the keyboard as a prefix to the message to be transmitted. The pager which receives this message obviously does not display the address code; but, [is] rather, *is* actuated after receipt and decoding of its particular address code. Thus, in the case of digital addresses, the keyboard of the subject pager may be utilized to formulate these addresses.

Figure 3:
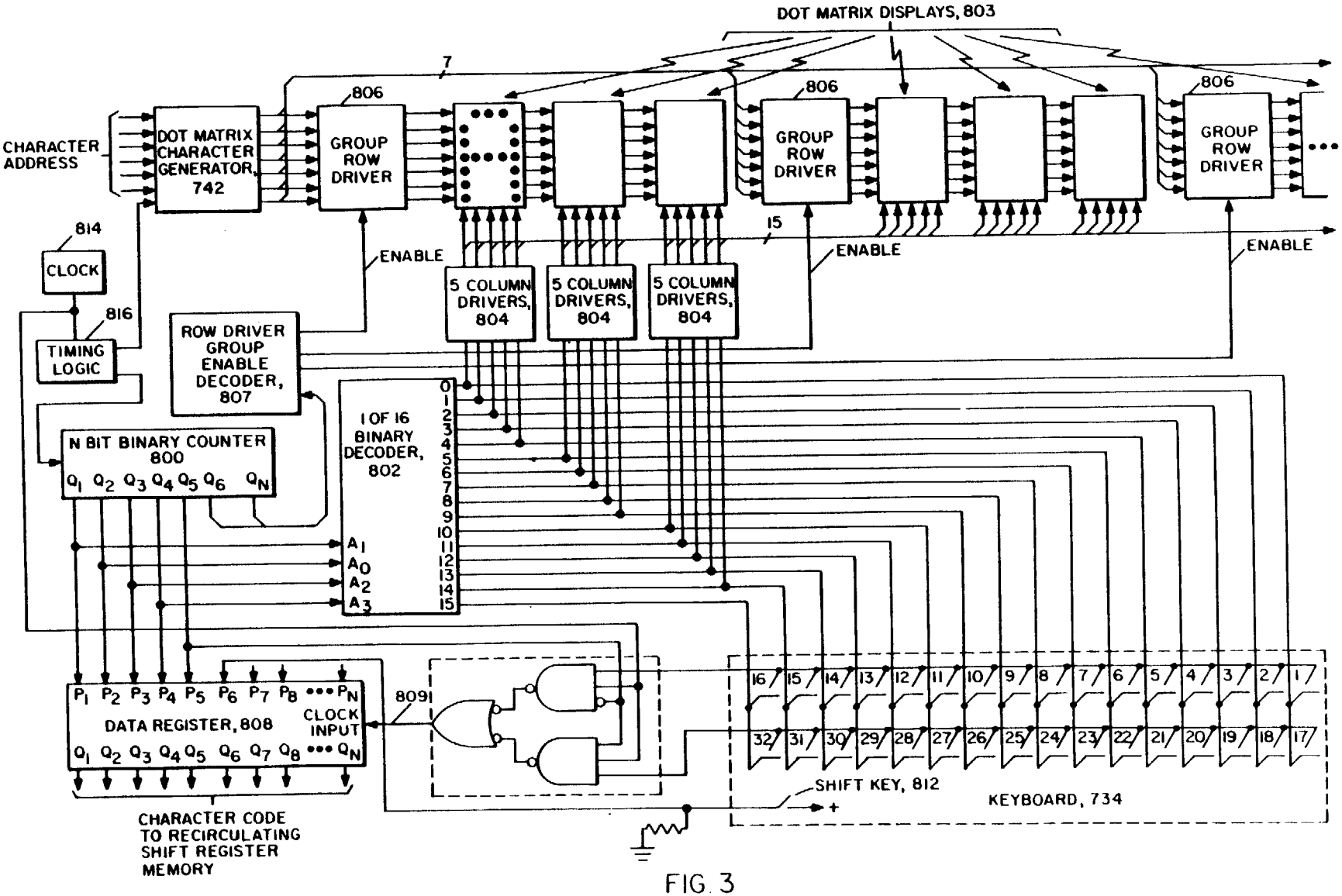
FIG. 3 is a more detailed block diagram of a portion of the pager/encoder of FIG. 2.

In another aspect of the subject invention, it is a feature that the same counter provides a timing sequence to refresh the LED dot matrix display by reading out the memory cyclically and provides for the encoding of signals [(i.e., character codes)] to be read into the recirculating shift register memory. In one configuration, illustrated in FIG. 3, an n-bit binary counter 800 in display refresh and encoder timing circuit 746 is utilized which has a certain number of least significant bits, for purposes of illustration in this case, [4] *four*. These *four* least significant bits are utilized through a [1-out of-16] *one-out-of-sixteen* binary decoder circuit 802 to drive the display made up of multiple 5×7 dot matrices 803 via column drivers 804 and to drive encoder keyboard 734 such that the data is read out in three character blocks. The rows of matrices 803 are driven by row driver 806 in accordance with dot matrix character generator 742. After the [4] *four* least significant bits, the next least significant bits are then routed to a row driver group enable decoder 807, also in circuit 746, which is utilized to drive the next group of characters to be presented. In this manner, the message is grouped via sets of three characters and, in this sense, the character generation and display is multiplexed. The use of the n-bit binary counter sets the multiplexing for the display such that a minimum of row and column drivers are required. This counter is used both in the encoding of a message when the message is to be encoded as well as in the driving of the display. What will now be described is the interaction of the keyboard with the n-bit binary counter to provide the [6] *six* bit ASCII character codes during the encoding operation.

As mentioned before, a [one-out-of 1] *one-out-of-sixteen* binary decoder 802 is provided along with [15] *fifteen* column drivers[,] and [16] *sixteen* column keyboard matrix 734. The function of this binary decoder is to decode the [4] *four* least significant bits of the n-bit binary counter and to simultaneously drive both the column drivers in sets of five and the [16] *sixteen* columns of the keyboard matrix.

In the generation of the [6] *six* bit ASCII code characters, the n-bit counter is continuously cycled via timing logic 816 to sequentially present by its states all ASCII character codes to a data register 808. Binary decoder 802 is also cycled to produce output pulses at its output terminals in a serial fashion so that during a complete cycle all characters are available as a combination of the signals from the n-bit counter. At the same time, the cycling binary decoder outputs are used to drive the columns to the display. This cycling occurs very rapidly to prevent flicker of the display. Since the outputs from the binary decoder are applied to different keys in a timed sequence, depending *on* the key switch closed at a given time in the read out cycle, an enable pulse correlated with the character to be encoded is gated over line 809 to data register 808 which is fed in parallel with the output of the n-bit binary counter. At any given time, the n-bit binary counter has an output which corresponds to a given character. Thus, at a given instant of time, the state of the n-bit counter corresponds to a character, for instance, the letter "M[.]". If the M key is depressed at this time, then the data register is loaded to encode M and this character is entered into the recirculating shift register memory.

The gating logic for gating the enable pulse to the data register is illustrated in dotted box 810 and operates in combination with the fifth bit of the n-bit shift register. The fifth bit determines whether it is the top or bottom row of the keyboard which is actuated. In one embodiment, the keyboard has two rows and [16] *sixteen* columns. An electronic (digital) switch is provided to enable the choosing of which row of the keyboard is actuated by controlling the state of the fifth bit in the n-bit shift register. This electronic switch includes a shift key 812.

In summary, it is the function of the binary decoder in the display refresh and keyboard decoder timing circuit 746 to provide [16] *sixteen* output terminals and to produce sequentially a series of pulses, each at a different output terminal *wherein* the time that each pulse is generated [corresponding] *corresponds* to a state of the counter as it cycles through its [16] *sixteen* states and, therefore, a character. This relates the output terminals to the character represented by the state of the n-bit binary counter. Thus, if a pulse appears at the "0" output of the binary decoder, this corresponds to a state of the n-bit binary counter and some predetermined ASCII character. If a pulse appears on the "1" output of the binary counter, this will occur at a subsequent period of time and indicates that the n-bit binary counter has changed thereby to recognize a different ASCII character. The closing of a keyboard switch connects the pulse from an associated output of the binary pointer to a gating system to provide a dump signal to the data register which changes its ASC II output with each change of the n-bit register. The binary decoder cycles through its [16] *sixteen* states sequentially such that the depression of a key will produce a clock pulse to the data register which clock pulse arrives at a time corresponding to the given character. Thus, in a given sequence, the delivery of a dump pulse to the data register results in the dumping of the particular ASCII code to the recirculating shift register memory. What has therefore been accomplished is that by delivering a dump pulse to the data register at a particular predetermined time in the sequence, the n-bit counter state is read out for that character through the data register and into the recirculating shift register memory as the appropriate ASCII code.

It will be appreciated, however, that if the key in the keyboard is depressed for a long period of time, absent any additional circuitry, the character will be repetitively read into the memory. This is undesirable since the depression of a key once is supposed to result in only one character being read into the memory. A circuit is therefore utilized which provides that for a single depression of a keyboard key, only one character is read into the recirculating shift register memory. Basically, this is accomplished by reading a clock 314 pulse only once for one key depression no matter how long the key is depressed. If multiple characters of the same type are to be read in, the key must be depressed a number of times.

Thus, the n-bit binary counter and binary decoder act as a single logic block or circuit to decode the characters entered at the keyboard while, at the same time, supplying timing signals to the column drivers of the display. In this connection, counter 800 is stepped through states representing all of the alpha/numeric characters. The binary decoder decodes these characters and produces, sequentially, a series of timing pulses at its output terminals. These signals sequentially actuate the columns of the matrices via drivers 804. Simultaneously, an output from a particular output terminal of the decoder defines a particular state of counter 800 and thus a character. It will be appreciated that counter 800 and decoder 802 are clocked quite rapidly such that the columns are actuated in quick succession. When a message is to be displayed, dot matrix character generator 742 is clocked and the first group row driver is enabled. Generator 742 produces the appropriate signals for energizing the appropriate dots for the first column of the character to be displayed. On the next clock pulse, generator 742 produces signals for energizing the appropriate dots for the next column of this same character, etc. Thus, the columns are always being quickly strobed while the rows are actuated in synchronism.

For keyboard encoding purposes, the outputs of decoder 802 function not as timing signals, but rather as signals indicative of the state of the binary counter. For instance, outputs 0–4 can correspond to characters A, B, C, and D. As mentioned before, the fifth n-bit binary counter output can be used to designate whether switches 1–16 are activated or switches 17–32. Thus, the [16] *sixteen* outputs of the decoder can determine

[32] *thirty-two* characters. If during the strobing a particular key is depressed, sometime during the strobing cycle a pulse will be delivered to logic 810 to cause data shift register 808 to transmit a binary code to the recirculating shift register memory. Because the pulse transmitted corresponds in time to a particular state of the n-bit counter, the character read out of the n-bit counter at this time is the one corresponding to the key depressed.

In this way, the same logic circuit serves to generate one set of signals for both display timing and character designation.

It will be noted that both the row drivers and the column drivers are multiplexed. First, the leftmost group row driver is activated simultaneously with the sequential activation of the columns associated with the three leftmost column drivers. After the first three matrices are activated, the next group row driver is activated and the next set of three matrices is enabled. Thus, the matrices are enabled in sets of three. In this embodiment, row driver selection is accomplished by circuitry within row enable decoder 807. It will be appreciated that the column drivers are sequenced by the connections of the column drivers to successive output terminals of decoder 802.

Although a specific [emobdiment] *embodiment* to the invention has been described in considerable detail for illustrative purposes, many modifications will occur to those skilled in the art. It is therefore desired that the protection afforded by Letters Patent be limited only by the true scope of the appended claims.

I claim:

1. A pager for displaying a message in alpha/numeric form comprising:
   - means for receiving address signals and coded message signals;
   - means for decoding said address [-] signals and for generating an actuation signal;
   - an internal memory for storing received message signals;
   - means for displaying an alpha/numeric message of a predetermined length, said display *means* having character display means at different lateral locations;
   - means responsive to said actuation signal for loading said message signals into said memory; and
   - means for reading out said memory, decoding the signals read out from said memory and for driving said display means with the decoded message in such a manner that said message precesses across said display by lateral displacement of a character in the message a number of times to next adjacent character locations [,] so that the character moves across the display from one side of the display to the other side, whereby long messages for a predetermined recipient may be displayed on a limited length display in a personally portable unit.

2. The pager of claim 1 wherein said memory is a recirculating memory which recirculates to precess the message.

3. The pager of claim 2 wherein said recirculating memory includes a shift register and means for advancing said shift register.

4. The pager of claim 3 wherein said pager includes means for freezing the precession and wherein said advancing means selectively advances said shift register continuously and a character at a time.

5. The pager of claim 1 wherein said display includes a number of light emitting diodes for defining the alpha/numeric character.

6. The pager of claim 5 wherein said light emitting diodes are arranged in a dot matrix.

7. A combination pager and message encoder comprising:
   - means for decoding a *first* message transmitted to said pager;
   - means for displaying said decoded *first* message in a precessing display in which characters in the *decoded first* message are laterally displaced a number of times to next adjacent character locations so that the characters move across the display from one side to the other side;
   - means including a keyboard for *composing and* encoding a *second* message; and
   - means for coupling said [encoded] *second* message to said precessing display, whereby a single precessing display is used for both message reception and message [encoding] *composition.*

8. The combination pager and message encoder of claim 7 wherein said encoding means further includes means for forming a serially encoded message stream corresponding to said encoded message.

9. The combination pager and message encoder of claim 8 and further including means adapted to couple said message stream to a telephone line via an acoustic coupler.

10. The combination of claim 8 and further including means at said pager and encoder for directly transmitting said message stream to other pagers in the vicinity of said pager-encoder combination.

11. In a pager adapted to receive *encoded* messages transmitted from a remote location,
   - means for decoding the transmitted message *into a form suitable for display;* and
   - means for displaying said decoded message in a precessing display in which characters in said decoded message are laterally displaced a number of times to next adjacent character locations so that the characters move across the display from one side to the other.

12. For use in combination with common carrier paging transmission apparatus having [a voice] *an audio* channel,
   - *a device including* an encoder remote from said apparatus having a keyboard for entering a message and means for transmitting to said paging transmission apparatus a series of coded audio tones indicative [to] *of* the message entered at said keyboard, *said device including a precessing display for displaying portions of the message entered at said keyboard in which characters are laterally displaced a number of times to next adjacent character locations so that the characters move from one side of the display to the other;* and
   - means for coupling said encoder to the audio channel of said transmitting apparatus, whereby the encoded message may be transmitted to a predetermined recipient via said audio channel after said apparatus has transmitted a predetermined address.

[13. The encoder of claim 12 and further including a precessing display at said encoder for displaying portions of the message entered at said keyboard in which characters are laterally displaced a number of times to next adjacent character locations so that the characters move from one side of the display to the other.]

14. The encoder of claim [13] *12* wherein said precessing display includes a recirculating memory for storing the message entered at said keyboard, and means for driving said display in accordance with the output of said recirculating memory, said recirculating memory being coupled to said precessing display through said drive means for driving it in a precessing manner with the recirculation of said memory.

15. A method for transmitting an alpha/numeric message to a predetermined pager adapted to receive and display the message *and having an address*, comprising the steps of:

*encoding said message and, simultaneously in a precessing alpha/numeric display, precessing said message across said display such that characters in the message are laterally displaced a number of times to next adjacent character locations so that the characters move from one side of the display to the other;* dialing a telephone number corresponding to said [predetermined] address, transmitting signals on an RF carrier, indicative of said [predetermined] address to activate said predetermined pager from a central transmitter *remote from said encoding and from said display*; [and]

*wherein said encoding step, said dialing step and said first transmitting step being performed in any relative order, provided that said dialing step precedes said first transmitting step and said second transmitting step;*

*converting the encoded message produced by said encoding step into a series of audio tones indicative of said message;*

[generating a series of audio tones indicative of] *coupling said audio tones to said transmitter; and transmitting* said message on the carrier from said central transmitter after transmitting said address signals [, said generating step including the steps of encoding said message at a location remote from said transmitter, converting said encoded message into audio tones, and coupling said audio tones to said transmitter].

16. A message encoding unit comprising:

means including a keyboard for encoding a message;

a memory for storing the encoded message;

a display including an arrangement of display elements, selected elements being [actuateable] *actuatable* to present an alpha/numeric character;

means for driving said display in accordance with selected characters in said memory such that a portion of an alpha/numeric message is presented by said display at any given time, said drive means including means for precessing said message across said display such that characters in the message are laterally displaced a number of times to next adjacent character locations so that the characters move from one side of said display to the other; and means for decoding the message in said memory and for making said decoded message available at an output thereof.

17. The message encoding unit of claim 16 wherein said memory includes a recirculating shift register memory and wherein said drive means includes means for incrementing said shift register memory.

18. The message encoding unit of claim 17 wherein said means for making said decoded message available includes means coupled to said memory for converting the message therein into a serial bit stream and means for coupling said serial bit stream to said output.

19. The message encoding unit of claim 16 wherein said drive means includes means for inhibiting said precession.

20. The message encoding unit of claim 19 wherein said memory includes a recirculating shift register memory, wherein said drive means includes means for incrementing said shift register memory and wherein said precession inhibiting means includes means for inhibiting said incrementing means.

21. The encoding unit of claim 16 wherein said display includes a dot matrix arrangement of display elements.

22. The encoding unit of claim 16 wherein said display includes light emitting diode elements.

*23. A combination pager and message encoder comprising:*

*means for decoding a first message transmitted to said pager;*

*means for displaying said decoded first message in a precessing display in which characters in the decoded first message are laterally displaced a number of times to next adjacent character locations so that the characters move across the display from one side to the other;*

*means including a keyboard for composing and encoding a second message; and*

*means for coupling said second message to said displaying means,*

*whereby a single precessing display is used for both message reception and message composition.*

*24. The encoder of claim 14 wherein said recirculating memory comprises a memory of capacity greater than that necessary to contain as many characters as can be displayed in said display at any one time.*

*25. A method as recited in claim 15, wherein said encoding step comprises encoding said message in a memory remote from said central transmitter.*

*26. A method for transmitting an alpha/numeric message to a predetermined pager adapted to receive and display the message, comprising the steps of:*

*dialing a telephone number corresponding to a predetermined address;*

*transmitting signals on an RF carrier indicative of said predetermined address to activate said predetermined pager from a central transmitter; and*

*generating a series of audio tones indicative of said message on the carrier from said central transmitter after transmitting said address signals, said generating step including the steps of encoding said message while simultaneously displaying said message in a precessing alpha/numeric display which precesses said message across said display such that characters in the message are laterally displaced a number of times to next adajcent character locations so that the characters move from one side of the display to the other at a location remote from said transmitter, converting said encoded message into audio tones, an coupling said audio tones to said transmitter.*

*27. A method as recited in claim 26, wherein said encoding step comprises encoding said message in a memory at a location remote from said central transmitter.*

* * * * *